United States Patent
Xiao

(10) Patent No.: US 12,450,917 B2
(45) Date of Patent: Oct. 21, 2025

(54) METHOD AND APPARATUS FOR AUTOMATIC PARKING SYSTEM

(71) Applicant: Harman International Industries, Incorporated, Stamford, CT (US)

(72) Inventor: Chuan Xiao, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 529 days.

(21) Appl. No.: 17/820,212

(22) Filed: Aug. 16, 2022

(65) Prior Publication Data
US 2023/0058428 A1 Feb. 23, 2023

(30) Foreign Application Priority Data
Aug. 20, 2021 (CN) .......................... 202110959211.8

(51) Int. Cl.
*G06V 20/58* (2022.01)
*G06V 10/75* (2022.01)
*G06V 10/82* (2022.01)

(52) U.S. Cl.
CPC .......... *G06V 20/586* (2022.01); *G06V 10/751* (2022.01); *G06V 10/82* (2022.01)

(58) Field of Classification Search
CPC .... G06V 20/586; G06V 10/751; G06V 10/82; G06T 2207/20044; G06T 2207/20084; G06T 2207/30264; G06T 7/11
See application file for complete search history.

(56) References Cited

U.S. PATENT DOCUMENTS

| 11,853,077 B1 * | 12/2023 | Glas ...................... G05D 1/6482 |
| 2020/0089974 A1 * | 3/2020 | Ding ...................... G06V 10/82 |
| 2021/0192227 A1 * | 6/2021 | Lu ............................ G06T 7/70 |

FOREIGN PATENT DOCUMENTS

| CN | 109993991 A | 7/2019 |
| CN | 110334625 A | 10/2019 |
| CN | 113147738 A | 7/2021 |

OTHER PUBLICATIONS

Abecassis, F., "OpenCV—Morphological Skeleton," Felix Abecassis Website, Available Online at https://felix.abecassis.me/2011/09/opencv-morphological-skeleton/, Sep. 20, 2011, 4 pages.
Wu, Y. et al., "VH-HFCN based Parking Slot and Lane Markings Segmentation on Panoramic Surround View," Proceedings of the 2018 IEEE Intelligent Vehicles Symposium (IV), Jun. 26, 2018, Changshu, Suzhou, China, 6 pages.
European Patent Office, Extended European Search Report Issued in Application No. 22190761.1, Jan. 9, 2023, Germany, 9 pages.

* cited by examiner

*Primary Examiner* — Wassim Mahrouka
(74) *Attorney, Agent, or Firm* — McCoy Russell LLP

(57) ABSTRACT

The present disclosure provides a method and apparatus for an automatic parking system. The method includes: obtaining a parking-line segmentation image through a segmentation neural network; preprocessing the parking-line segmentation image to obtain at least one parking-line skeleton image; and calculating straight-line equations and straight-line endpoints for parking lines in the parking-line segmentation image based on the at least.

13 Claims, 11 Drawing Sheets

18a

18b

18c

18d

METHOD AND APPARATUS FOR AUTOMATIC PARKING SYSTEM

CROSS-REFERENCE TO RELATED APPLICATIONS

The present application claims priority to Chinese Patent Application No. 202110959211.8, entitled "METHOD AND APPARATUS FOR AUTOMATIC PARKING SYSTEM," and filed on Aug. 20, 2021. The entire contents of the above-listed application is hereby incorporated by reference for all purposes.

TECHNICAL FIELD

The present disclosure generally relates to the field of image processing, and in particular, to a computing method and apparatus used in a parking system.

BACKGROUND

An automatic parking system needs to perceive the position of a parking space in a world coordinate system. Since the parking spaces are generally drawn with a parking space marking line on a road surface in a parking area, a very popular method among various solutions is to use a computer vision algorithm to detect parking spaces on a panoramic aerial surround-view image of a vehicle. In the field of computer vision, a deep learning algorithm is more and more popular because it outperforms conventional vision methods in terms of robustness. In an automatic parking system, a method for detecting a parking space includes: using a segmentation neural network in a vehicle surround view to calculate pixels belonging to parking lines, calculating straight-line equations and endpoints and points of intersection of straight lines for each parking line, matching the detected straight lines, the straight-line endpoints, and the points of intersection of the straight lines with each other through a prior rule to obtain an area of parking place in the vehicle surround view, and then mapping into world coordinates. In this method, on the one hand, the neural network may help to obtain a high-precision segmentation result of a parking space segmentation line, e.g., to obtain a high-precision parking-line segmentation image; on the other hand, it may help to calculate accurate straight-line equations and straight-line endpoints for parking lines.

Currently, although there are many neural network frameworks that may be used to obtain relatively accurate segmentation results, it is still very challenging to calculate accurate straight-line equations and straight-line endpoints for parking lines. There are currently some algorithms that may be used to obtain linear equations and endpoints, but it is difficult for most of the algorithms to set parameters in a changing environment. Furthermore, the mutual influence of multiple lines may also affect the accuracy of the calculation.

Therefore, there is a need for an improved technical solution to overcome the above shortcomings of the existing solutions.

SUMMARY

According to an aspect of the present disclosure, a method for an automatic parking system is provided. The method may include: obtaining a parking-line segmentation image through a segmentation neural network; preprocessing the parking-line segmentation image to obtain at least one parking-line skeleton image; and calculating straight-line equations and straight-line endpoints for parking lines in the parking-line segmentation image based on the at least one parking-line skeleton image.

According to one or more embodiments, the preprocessing the parking-line segmentation image to obtain at least one parking-line skeleton image may include: extracting pixels belonging to parking lines from the parking-line segmentation image and displaying the pixels belonging to parking lines with first color, and displaying the remaining pixels not belonging to parking lines with second color, thereby generating an extracted parking-line segmentation image; and performing skeleton extraction on the extracted parking-line segmentation image to extract skeletons of the parking lines, thereby generating the at least one parking-line skeleton image.

According to one or more embodiments, the preprocessing the parking-line segmentation image to obtain at least one parking-line skeleton image may include: extracting pixels belonging to parking lines from the parking-line segmentation image and displaying the pixels belonging to parking lines with first color, and displaying the remaining pixels not belonging to parking lines with second color, thereby generating an extracted parking-line segmentation image; dilating the extracted parking-line segmentation image to generate a dilated parking-line segmentation image; and performing skeleton extraction on the dilated parking-line segmentation image to extract skeletons of the parking lines, thereby generating the at least one parking-line skeleton image.

According to one or more embodiments, the preprocessing the parking-line segmentation image to obtain at least one parking-line skeleton image may include: extracting pixels belonging to parking lines from the parking-line segmentation image and displaying the pixels belonging to parking lines with first color, and displaying the remaining pixels not belonging to parking lines with second color, thereby generating an extracted parking-line segmentation image; dilating the extracted parking-line segmentation image to generate a dilated parking-line segmentation image; determining at least one connection region based on the dilated parking-line segmentation image, wherein each connection region corresponds to a region in the dilated parking-line segmentation image, each connection region merely includes pixels of parking lines connected to each other, and the pixels of the parking lines belonging to different connection regions are separated from each other; dividing the dilated parking-line segmentation image according to the connection regions to generate sub-images respectively corresponding to different connection regions; and performing skeleton extraction on each sub-image to generate respective parking-line skeleton images corresponding to the sub-images.

According to one or more embodiments, the calculating straight-line equations and straight-line endpoints for parking lines in the parking-line segmentation image based on the at least one parking-line skeleton image may include: performing, for each parking-line skeleton image, the following operations: A: dividing the parking-line skeleton image into multiple patches; B: generating multiple straight-line equations based on the multiple patches, wherein each straight-line equation is formed by fitting the pixels with first color in each patch; C: selecting an optimal straight-line equation from the multiple straight-line equations, wherein the optimal straight-line equation represents the straight line matching the largest quantity of pixels with first color in the parking-line skeleton image; D: calculating the corresponding endpoints of the optimal straight-line equation in the parking-line skeleton image; and E: deleting the pixels with first color corresponding to the optimal straight-line equation from the parking-line skeleton image; repeating steps B-E in a loop until the number of loops reaches a straight-line quantity threshold or the quantity of remaining pixels with first color in the parking-line skeleton image is less than a pixel quantity threshold.

According to one or more embodiments, the generating multiple straight-line equations based on the multiple patches may include: performing, for each patch, the following operations in parallel: getting a patch; obtaining coordinates of the pixels with first color in the patch; and fitting a straight-line equation based on the obtained pixels with first color.

According to one or more embodiments, the method may further include: performing, for each patch, the following operations in parallel: determining whether the ratio of the quantity of pixels with first color matched by the straight-line equation to the quantity of all pixels with first color in the patch is greater than a ratio threshold, wherein the pixel with first color in the patch whose distance from the straight line represented by the straight-line equation is less than a distance threshold is considered to be the pixel with first color matched by the straight-line equation; transferring the straight-line equation to a coordinate system of the parking-line skeleton image to represent a straight line in the parking-line skeleton image, and in response to the ratio of the quantity of pixels with first color matched by the straight-line equation to the quantity of all pixels with first color in the patch being greater than the ratio threshold, taking the number of pixels with first color whose distances from the straight line are less than the distance threshold in the parking-line skeleton image as a value of a comparison parameter; and setting the value of the comparison parameter to 0 in response to the ratio of the quantity of pixels with first color matched by the straight-line equation to the quantity of all pixels with first color in the patch being equal to or less than the ratio threshold.

According to one or more embodiments, the method may further include: comparing multiple comparison parameter values calculated for multiple patches; and selecting the straight-line equation corresponding to the largest comparison parameter value among the multiple comparison parameter values as the optimal straight-line equation.

According to one or more embodiments, the method may further include: filtering the generated parking-line skeleton image to generate a filtered parking-line skeleton image.

According to another aspect of the present disclosure, an apparatus for an automatic parking system is provided, including: a memory and a processor. The memory is configured to store computer-executable instructions. The processor is configured to execute the instructions to implement the method described above.

BRIEF DESCRIPTION OF THE DRAWINGS

The present disclosure may be better understood by reading the following description of non-limiting implementations with reference to the accompanying drawings, in which.

DETAILED DESCRIPTION

It should be understood that the following description of the embodiments is given for purposes of illustration only and not limitation. The division of examples in functional blocks, modules or units shown in the figures should not be construed as implying that these functional blocks, modules or units must be implemented as physically separate units. The functional blocks, modules or units shown or described may be implemented as separate units, circuits, chips, functional blocks, modules, or circuit elements. One or more functional blocks or units may also be implemented in a common circuit, chip, circuit element, or unit.

The use of singular terms (for example, but not limited to, "a") is not intended to limit the number of items. Relational terms, for example but not limited to, "top", "bottom", "left", "right", "upper", "lower", "down", "up", "side", "first", "second" ("third", etc.), "entry", "exit", etc. are used in the written description for clarity in specific reference to the drawings and are not intended to limit the scope of the present disclosure or the appended claims, unless otherwise noted. The terms "couple," "coupling," "being coupled," "coupled," "coupler", and similar terms are used broadly herein and may include any method or device for fixing, bonding, adhering, fastening, attaching, associating, inserting, forming thereon or therein, communicating with, or otherwise directly or indirectly mechanically, magnetically, electrically, chemically, and operatively associated with an intermediate element and one or more members, or may also include, but is not limited to, one member being integrally formed with another member in a unified manner. Coupling may occur in any direction, including rotationally. The terms "including" and "such as" are illustrative rather than restrictive, and the word "may" means "may, but not necessarily", unless stated otherwise. Although any other language is used in the present disclosure, the embodiments shown in the figures are examples given for purposes of illustration and explanation and are not the only embodiments of the subject matter herein.

The present disclosure provides a robust and fast method and system for an automatic parking system. The method and system calculate straight-line equations and straight-line endpoints for parking lines based on a parking-line segmentation image of a panoramic aerial surround-view image of a vehicle. The method provided by the present disclosure can obtain reliable and robust straight-line equations, so that an accurate straight-line equation can be detected even when the splicing distortion of parking lines is serious and the detection result of a segmentation network is irregular, thereby providing reliable information for subsequent detection of a parking space. Meanwhile, the method provided by the present disclosure may adopt a parallel calculation mechanism, which provides a favorable guarantee for the calculation speed of an algorithm.

Figure 1:
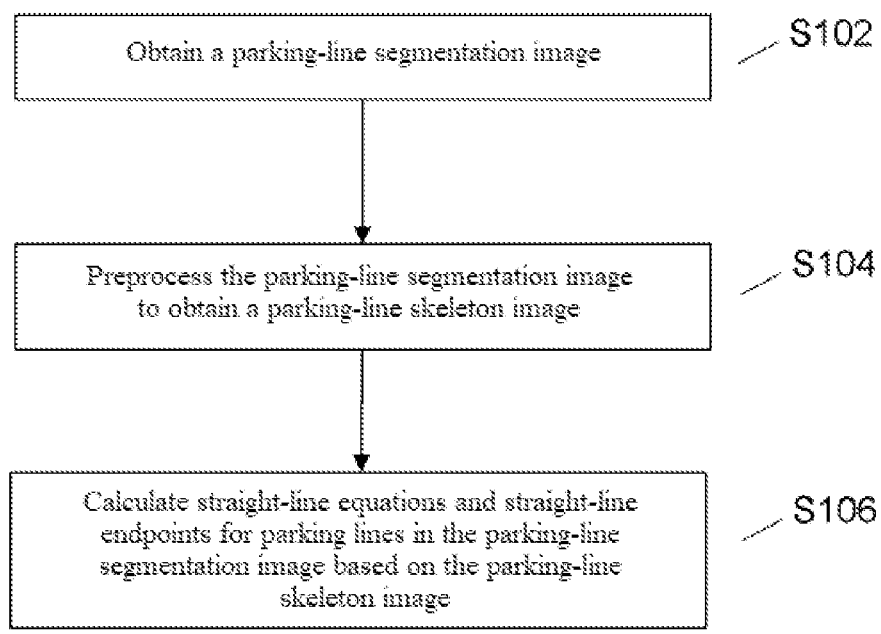
FIG. 1 exemplarily shows a flow chart of a method according to one or more embodiments of an implementation of the present disclosure.

A calculation method and apparatus of various embodiments of the present disclosure will be described in detail below with reference to the accompanying drawings. FIG. 1 shows a flow chart of a method according to one or more embodiments of an implementation of the present disclosure. As shown in FIG. 1, at S102, a parking-line segmentation image is obtained. Specifically, a parking-line segmentation image may be obtained through a segmentation neural network. At S104, the parking-line segmentation image is preprocessed to obtain at least one parking-line skeleton image. At S106, straight-line equations and straight-line endpoints are calculated for parking lines in the parking-line segmentation image based on the at least one parking-line skeleton image. The method shown in FIG. 1 can obtain reliable and effective intermediate data and related auxiliary information by preprocessing a parking-line segmentation image output from a segmentation neural network, thereby calculating straight-line equations more reliably and avoiding the influence of some noise.

Figure 2:
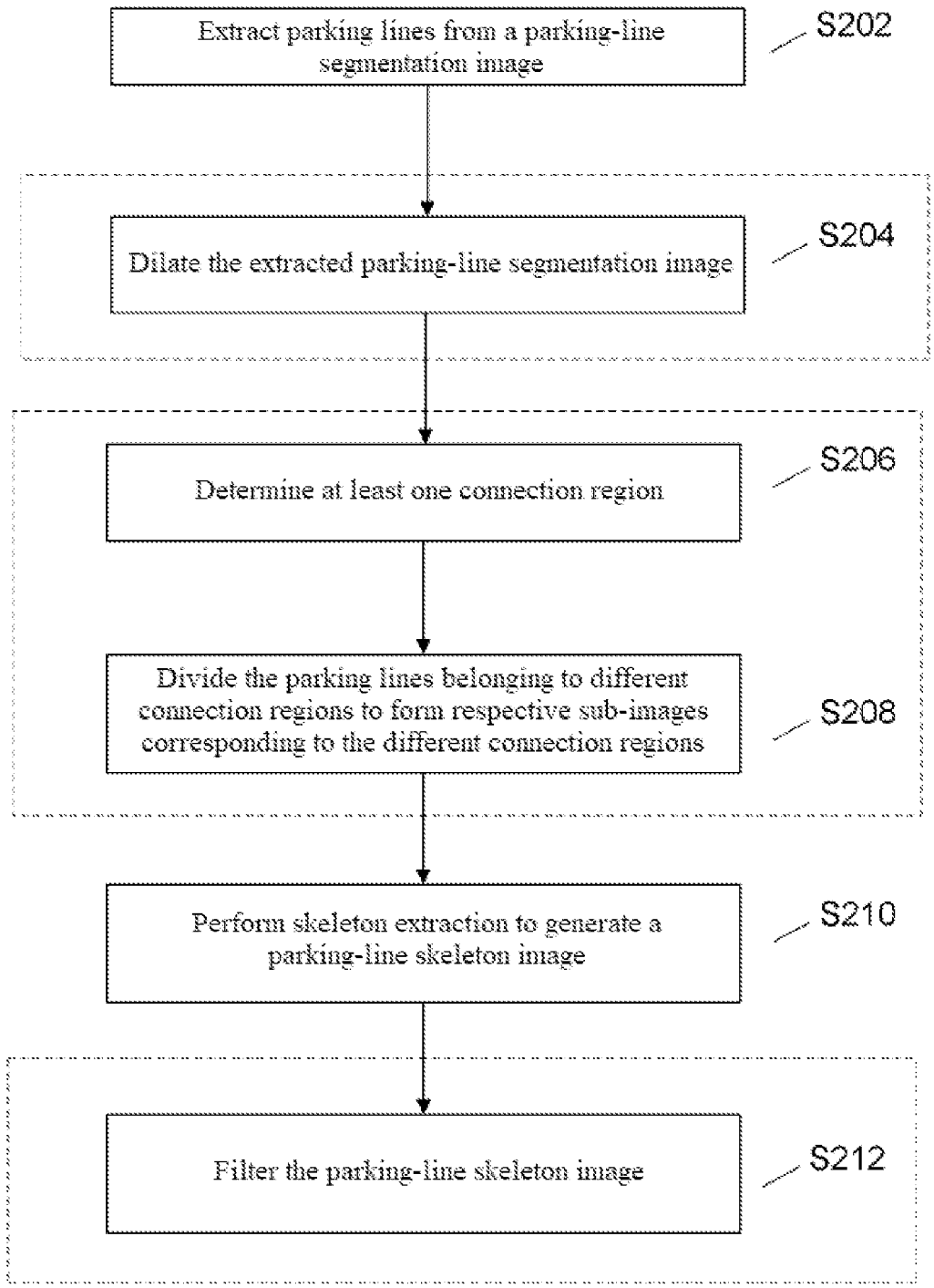
FIG. 2 exemplarily shows a flow chart of preprocessing a parking-line segmentation image according to one or more embodiments of an implementation of the present disclosure.

FIG. 2 shows a flow chart of a method for preprocessing a parking-line segmentation image according to one or more embodiments of an implementation of the present disclosure. Those skilled in the art may understand with reference to the following description of FIG. 2 that the steps in a dotted box in FIG. 2 may be used as preferred steps.

In some embodiments, the preprocessing method may include: extracting, at S202, parking lines from the parking-line segmentation image, thereby generating an extracted parking-line segmentation image. In some examples, pixels belonging to parking lines are extracted from the parking-line segmentation image and the pixels belonging to parking lines are displayed with first color (for example, white), and the remaining pixels not belonging to parking lines are displayed with second color (for example, black), thereby generating an extracted parking-line segmentation image. After performing the processing at S202, the method proceeds directly to S210. At S210, extraction is performed on the extracted parking-line segmentation image to extract skeletons of the parking lines, thereby generating the parking-line skeleton image.

In some other embodiments, the preprocessing method may include: extracting parking lines from the parking-line segmentation image, thereby generating an extracted parking-line segmentation image (S202). However, after performing the processing at S202, the method proceeds to S204. At S204, the extracted parking-line segmentation image is first dilated to generate a dilated parking-line segmentation image. Then, the method proceeds to S210. At S210, extraction is performed on the dilated parking-line segmentation image to extract skeletons of the parking lines, thereby generating the parking-line skeleton image.

Furthermore, in some other embodiments, the preprocessing method may include: extracting, at S202, parking lines from the parking-line segmentation image, thereby generating an extracted parking-line segmentation image. After performing the processing at S202, the method proceeds to S204. At S204, the extracted parking-line segmentation image is first dilated to generate a dilated parking-line segmentation image. Then, the method proceeds to S206. At S206, at least one connection region is determined based on the dilated parking-line segmentation image. Each connection region corresponds to a region in the dilated parking-line segmentation image, each connection region merely includes pixels of parking lines connected to each other, and the pixels of the parking lines belonging to different connection regions are separated from each other. Then, the method continues to proceed to S208. At S208, the dilated parking-line segmentation image is divided according to the connection regions to generate sub-images respectively corresponding to different connection regions. Finally, the method proceeds to S210. At S210, extraction is performed on each sub-image to generate respective parking-line skeleton images corresponding to the sub-images.

In addition, in some examples, the preprocessing method according to the above various embodiments may further include step S212. At S212, the generated parking-line skeleton image of parking lines is filtered to generate a filtered parking-line skeleton image.

Figure 3:
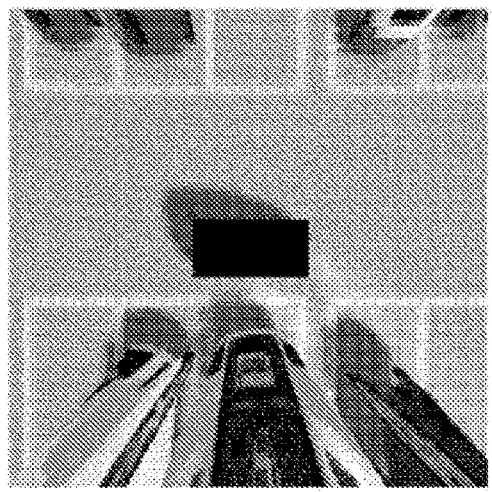
FIG. 3 exemplarily shows a panoramic aerial surround-view image of a vehicle and a parking-line segmentation image obtained by a segmentation neural network based on the panoramic aerial surround-view image of the vehicle.
Figure 3:
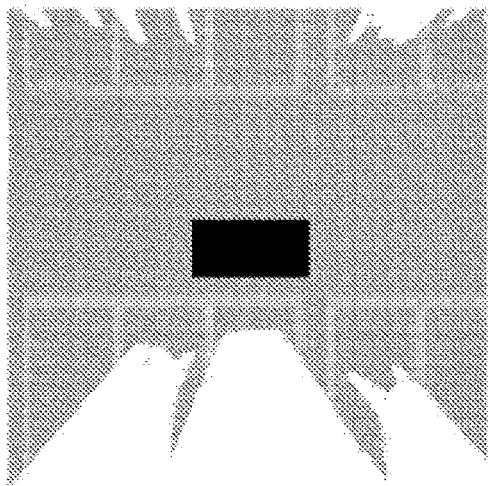

In order to be more intuitive, each step in the preprocessing method according to the above various embodiments is described in further detail below with reference to FIGS. 3-13. FIG. 3 shows a parking-line segmentation image obtained by, for example, a segmentation neural network, taking a panoramic aerial surround-view image of a vehicle in a garage as an example. The left image in FIG. 3 is the panoramic aerial surround-view image of the vehicle, and the right image is the parking-line segmentation image. The parking-line segmentation image is obtained by classifying pixels in the panoramic aerial surround-view image shown in the left image by the segmentation neural network.

Figure 4:
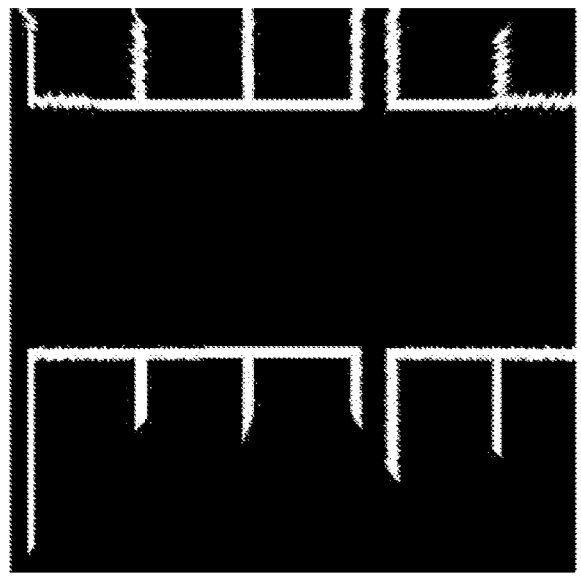
FIG. 4 exemplarily shows a schematic diagram of an extracted parking-line segmentation image according to one or more embodiments of an implementation of the present disclosure.

In some examples, the extraction processing performed at S202 is to extract the pixels detected by the neural network that belong to the parking lines (which may also be referred to as parking space segmentation lines), and filter out the pixels that do not belong to the parking lines. In the extracted parking-line segmentation image, these two kinds of pixels are represented by two colors. For example, the pixels belonging to parking lines are displayed with white color, and the pixels not belonging to parking lines are displayed with black color. The extracted parking-line segmentation image is shown in FIG. 4.

Figure 5:
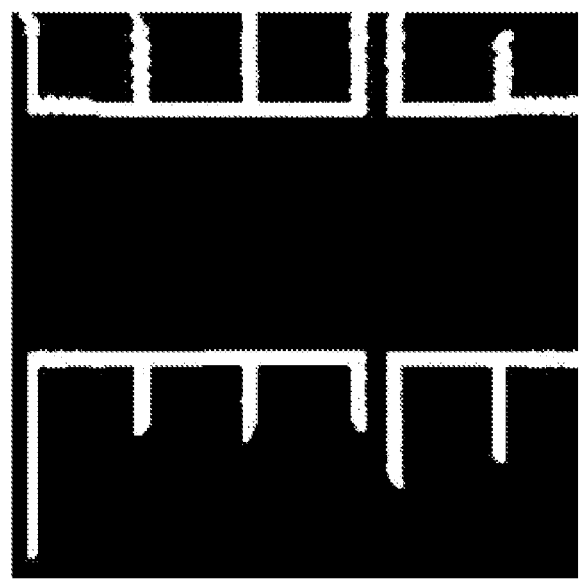
FIG. 5 exemplarily shows a schematic diagram of a dilated parking-line segmentation image according to one or more embodiments of an implementation of the present disclosure.

In some embodiments, preferably, the extracted parking-line segmentation image may be dilated at S204, and the generated dilated parking-line segmentation image is shown in FIG. 5. It will be appreciated from the above that in some embodiments, skeleton extraction may be directly performed on the dilated parking-line segmentation image, thereby generating the parking-line skeleton image. Further, the generated parking-line skeleton image may also be filtered. In order to save space, no further description is given here in conjunction with the schematic diagram of image processing.

Figure 6:
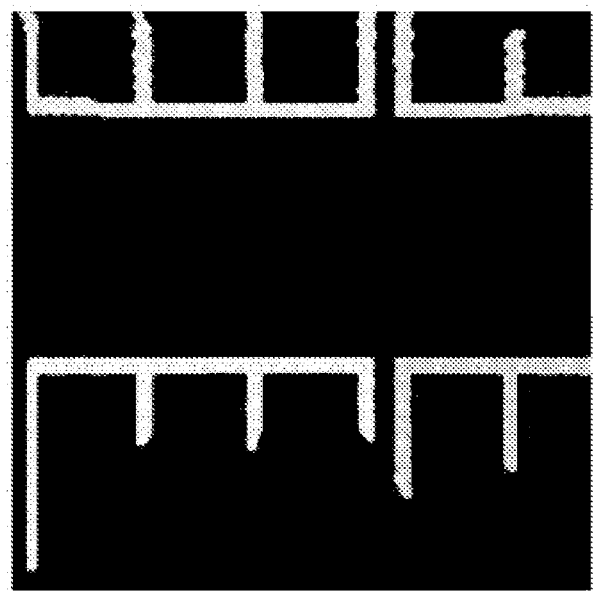
FIG. 6 exemplarily shows a schematic diagram of a parking-line segmentation image in which a connection region is determined according to one or more embodiments of an implementation of the present disclosure.

FIG. 6 shows a schematic diagram of a result of determining connection regions performed at S206. For visual representation, FIG. 6 distinctively shows different connection regions found in the dilated parking-line segmentation image with different gray scales. It can be seen that the connection region is a region including parking lines connected together, and parking lines belonging to different connection regions are not connected to each other. In some examples, different connection regions may also be classified by pixels (for example, pixel coordinates). The purpose of determining at least one connection region is to calculate the pixels of the parking lines connected together as a single image, so as to avoid the situation where the pixels in different connection regions affect each other and the calculation result is inaccurate. It will be appreciated that FIGS. 3 to 6 are only for helping understanding, and the distribution of parking lines and the number of connection regions determined therefrom are not limited by the above examples. In an actual scenario, if the obtained panoramic aerial surround-view images of the vehicle are different, the generated parking-line segmentation images are different, and the number of qualified connection regions may also be different.

Figure 7:
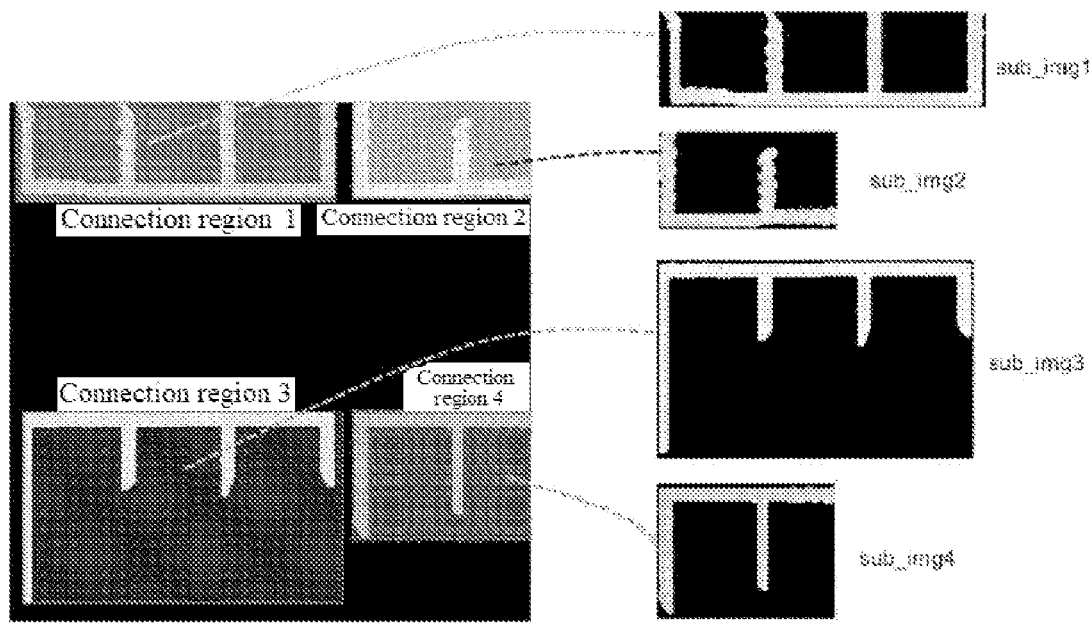
FIG. 7 exemplarily shows a schematic diagram of dividing a parking-line segmentation image according to connection regions according to one or more embodiments of an implementation of the present disclosure.

In some embodiments, preferably, at S208, the parking lines belonging to different connection regions may be further divided to form respective sub-images corresponding to different connection regions. For example, the dilated parking-line segmentation image shown in FIG. 5 will be divided into different sub-images according to different connection regions, such as sub_img1, sub_img2, sub_img3, and sub_img4, as shown in FIG. 7.

It will be appreciated that the extraction processing performed at S210 may be based on different types of parking-line segmentation images generated in the above embodiments, such as parking-line segmentation images generated merely through the extraction step, parking-line segmentation images generated through the dilation step, and parking-line segmentation images corresponding to sub-images obtained after further division according to connection regions. In order to save space, merely the sub-images shown in FIG. 7 are used as an example for the following description.

Figure 8:
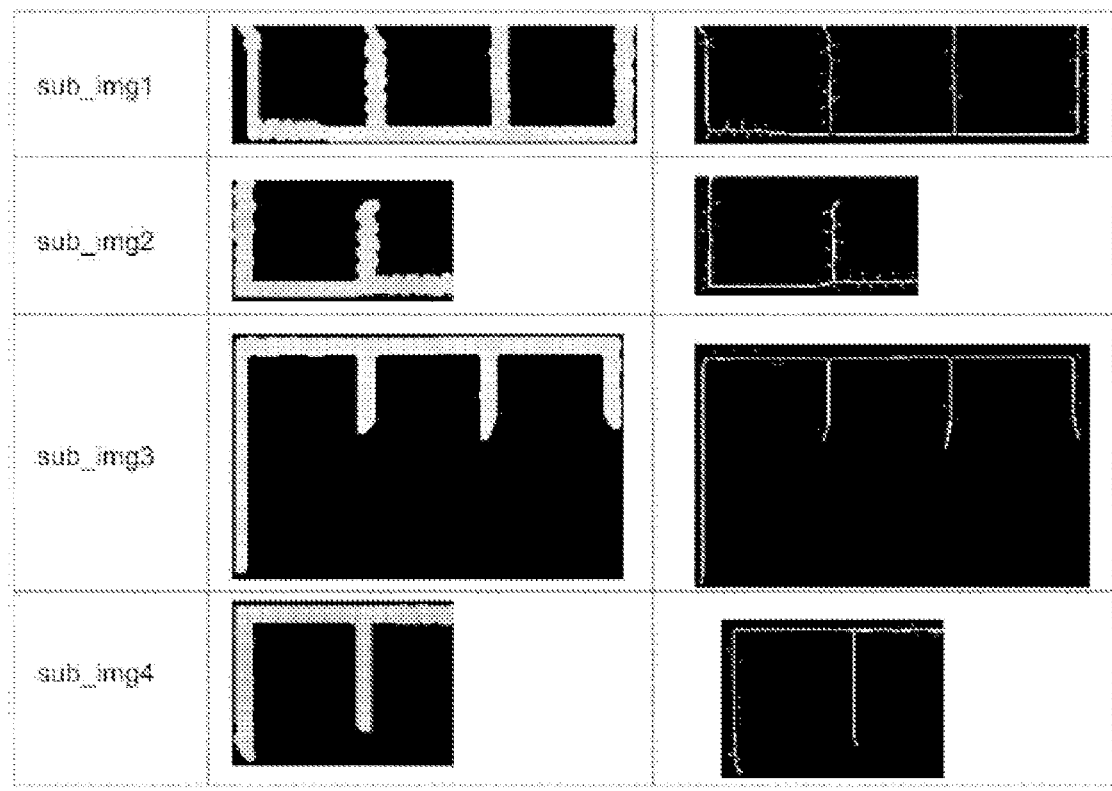
FIG. 8 exemplarily shows a schematic diagram of sub-images obtained by dividing a parking-line segmentation image and corresponding parking-line skeleton images according to one or more embodiments of an implementation of the present disclosure.

At S210, skeleton extraction is performed on the parking-line segmentation image to extract skeletons of the parking lines, thereby generating the parking-line skeleton image. FIG. 8 exemplarily shows a result of the skeleton extraction performed on each sub-image at S210. The middle column of FIG. 8 shows the corresponding sub-images sub_img1, sub_img2, sub_img3, and sub_img4 shown in FIG. 7, and the rightmost column is a result of skeleton extraction of corresponding sub-images.

Figure 9:
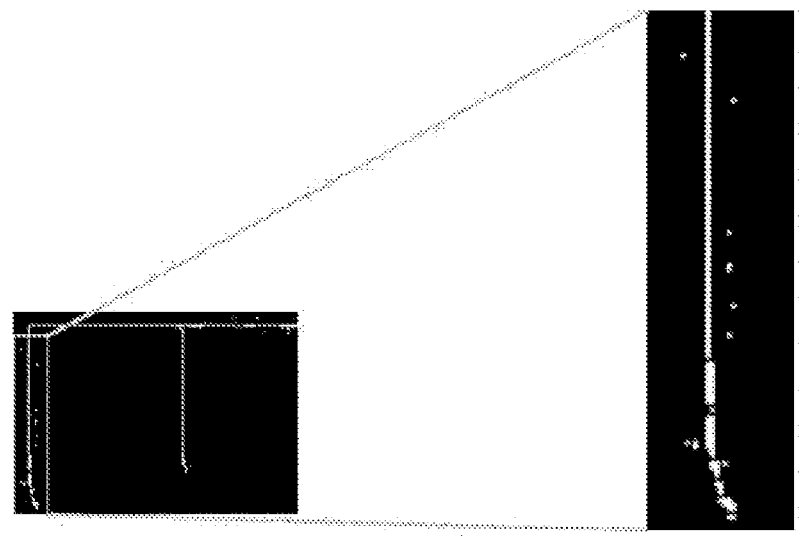
FIG. 9 exemplarily shows a partially enlarged result of a parking-line skeleton image according to one or more embodiments of an implementation of the present disclosure.
Figure 10:
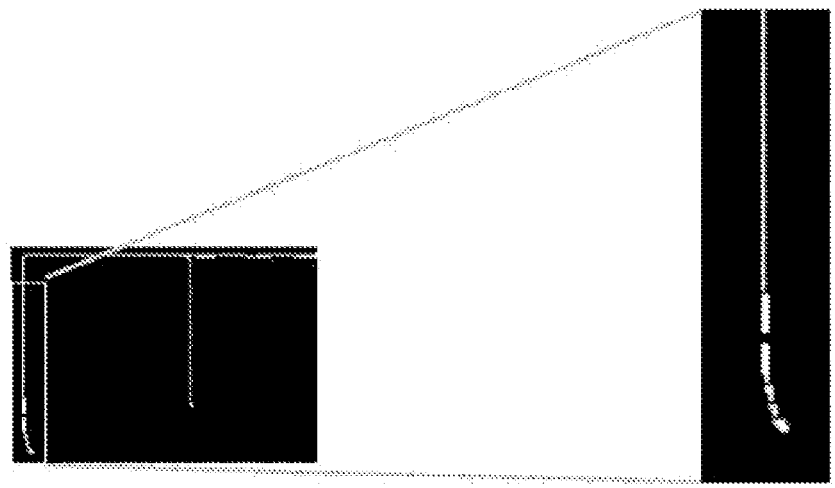
FIG. 10 exemplarily shows a partially enlarged result of a filtered parking-line skeleton image according to one or more embodiments of an implementation of the present disclosure.

Due to the inaccurate output results of seams or segmentation networks, there will be many isolated pixel blocks at the periphery of straight lines after the skeleton extraction. For illustration, FIG. 9 shows a result of partial enlargement of a skeleton image corresponding to sub_img4. It can be seen that there are many isolated pixel blocks at the periphery of the straight lines after the skeleton extraction. Therefore, preferably, at S212, each parking-line skeleton image may also be filtered, so as to delete the small isolated pixel blocks caused by the skeleton extraction. For example, these small isolated pixel blocks may be deleted by calculating the quantity of white pixels in the connection regions. The filtered parking-line skeleton image corresponding to sub_img4 is shown in FIG. 10. In the right partial enlarged image, it can be seen that the isolated pixel blocks have been deleted.

Figure 11:
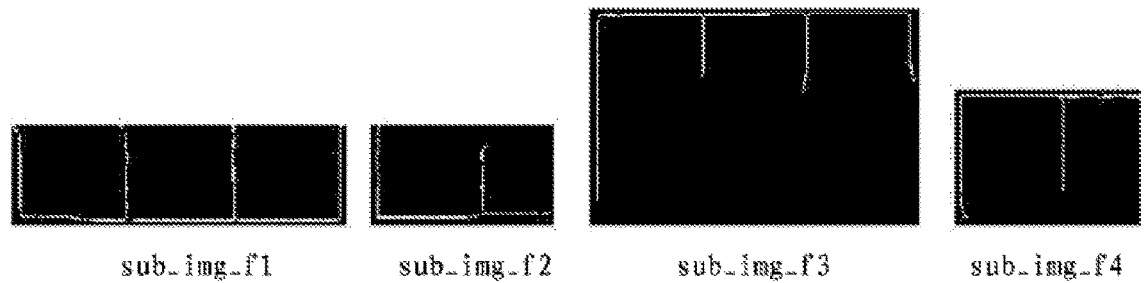
FIG. 11 exemplarily shows a filtered parking-line skeleton image according to one or more embodiments of an implementation of the present disclosure.

After the preprocessing process in one or more of the embodiments described above, the parking-line skeleton image generated after the preprocessing may be finally obtained. As described above, those skilled in the art will appreciate that the parking-line skeleton image obtained after the preprocessing of the parking-line segmentation image in the above various embodiments may be applied to the method for calculating straight-line equations and straight-line endpoints that will be described hereinafter. In order to save space, the following calculation method will merely take the parking-line skeleton image obtained after preprocessing the parking-line segmentation image shown in FIG. 11 as an example. FIG. 11 shows a parking-line skeleton image obtained after the preprocessing processes S202-S212 of the parking-line segmentation image, for example, including the filtered parking-line skeleton images sub_img1_f1, sub_img1_f2, sub_img1_f3, and sub_img1_f4.

So far, the preprocessing process of a panoramic surround aerial-view segmentation image of a vehicle ends. The preprocessing process described in each of the above embodiments has the following advantages.

Firstly, extracting the parking-line skeleton image based on the parking-line segmentation image will be more conducive to calculating straight-line equations therefor. Furthermore, filtering the parking-line skeleton image is further conducive to avoiding the influence of noise and improving the robustness.

Figure 12:
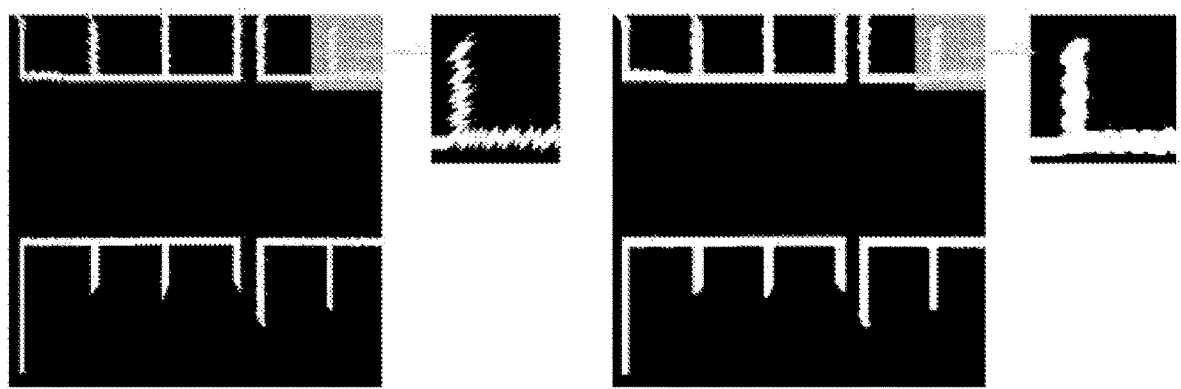
FIG. 12 exemplarily shows an effect comparison of whether to dilate a parking-line segmentation image (striated cracks at a splice) according to one or more embodiments of an implementation of the present disclosure.
Figure 13:
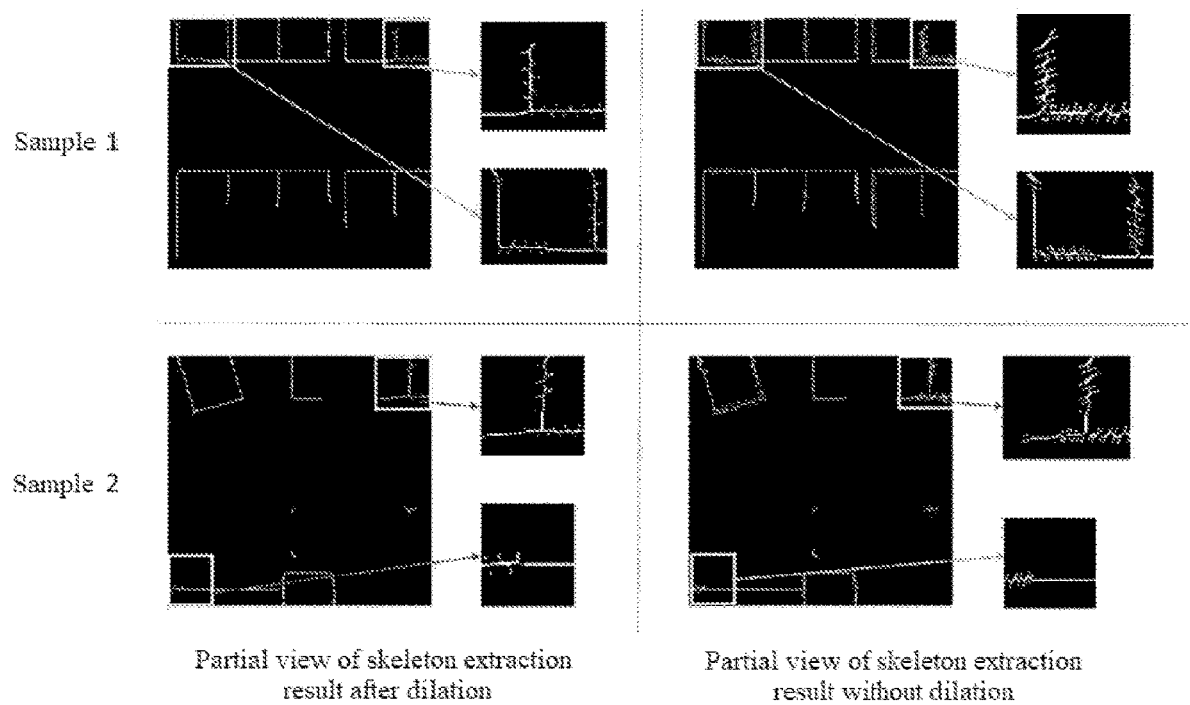
FIG. 13 exemplarily shows a result comparison of performing skeleton extraction on a parking-line segmentation image under two situations of dilation and no dilation according to one or more embodiments of an implementation of the present disclosure.

Secondly, since the panoramic aerial surround-view image of the vehicle is spliced from multiple pictures, the splicing often leads to picture distortion, such as striated cracks shown in FIG. 12. Due to the insufficient accuracy of the segmentation network, the parking lines cannot be detected completely, which may result in subsequent inaccurate calculation of the straight-line equations. The dilation processing helps to eliminate the striated cracks formed by splicing, and also to repair the incomplete detection of the parking-lines by the segmentation network, so as to prepare for the next step of skeleton extraction. FIG. 12 shows an effect comparison between striated cracks at the splicing of the parking-line segmentation image under two situations of dilation and no dilation. In FIG. 12, the original parking-line segmentation image is illustrated in the left, and the dilated parking-line segmentation image is illustrated in the right. It can be seen that the dilated parking-line segmentation image has a better effect. Further, FIG. 13 shows a result comparison of performing skeleton extraction on a parking-line segmentation image under two situations of dilation and no dilation. It can be seen that the straight line obtained after the dilation processing (the left part) is cleaner, there is less noise at the periphery of the straight line, and the existence of these noise will affect the later calculation accuracy.

Thirdly, after the skeleton extraction, some isolated pixels or pixel blocks may be formed at the periphery of the skeletonized straight line (see FIG. 9). These isolated pixels or pixel blocks may be deleted by filtering to reduce the influence of noise.

Fourthly, the division according to connection regions make the straight line be calculated independently in different connection regions, so as to avoid the influence of the pixels in other connection regions on the calculation accuracy.

Fifthly, the two steps of skeleton extraction for sub-images of different connection regions and filtering of the parking-line skeleton image after the skeleton extraction are both independent calculations for multiple sub-images. Therefore, parallel calculation (such as opencl and multi-threading) may be used to accelerate the algorithm.

Figure 14:
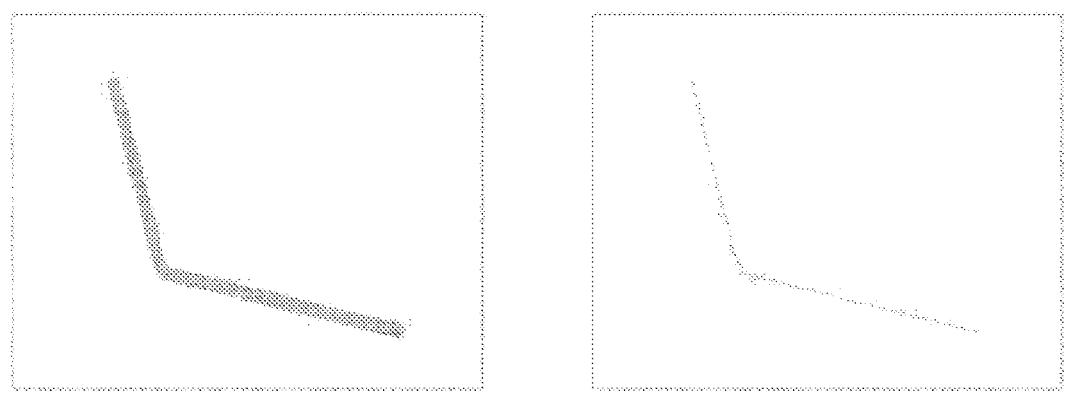
FIG. 14 exemplarily shows a situation in which intersecting straight lines may affect the accuracy in existing calculation methods.

The following will explain how to calculate the straight-line equations and endpoints for the parking lines based on the preprocessed parking-line skeleton image. At present, there are many methods for detecting straight lines from images, such as Hough straight line detection, LSD, and other methods. Although some methods also have strong robustness, these methods still have the following problems. 1) Some algorithms need to set parameters, but since the detection results in different environments are too sensitive to parameters, it is difficult to set the parameters uniformly. 2) In an image, a positional relationship between straight lines will affect the solution accuracy. For example, FIG. 14 shows a situation where the presence of intersecting straight lines may affect the accuracy. As shown in FIG. 14, a picture having a straight line to be detected is in the left. It can be clearly seen that the left picture contains two straight lines, but some current algorithms may obtain through calculation an additional straight line at a point of intersection, as shown in the right picture.

The method for calculating straight-line equations and straight-line endpoints provided by the present disclosure will avoid the above problems, thereby making the calculation more accurate. The calculation method of the present disclosure includes: dividing each obtained parking-line skeleton image sub_img_f (for example, sub_img1_f1, sub_img1_f2, sub_img1_f3, and sub_img1_f4 shown in FIG. 11) into several patches, fitting a straight-line equation representing a straight line for pixels (for example, white pixels) belonging to the straight line in each patch, and after fitting one straight-line equation for each of the patches, selecting a straight-line equation that matches well in a competitive manner (for example, selecting a straight-line equation that matches the most pixels in sub_image_f). Then, the pixels corresponding to the optimal straight-line equation are deleted from sub_image_f. After that, a second straight line is found from sub_image_f in the same way, and so on, until all the straight lines in the parking-line skeleton image sub_image_f are found, that is, the straight-line equations corresponding to all the straight lines in the parking-line skeleton image sub_image_f are calculated.

Figure 15:
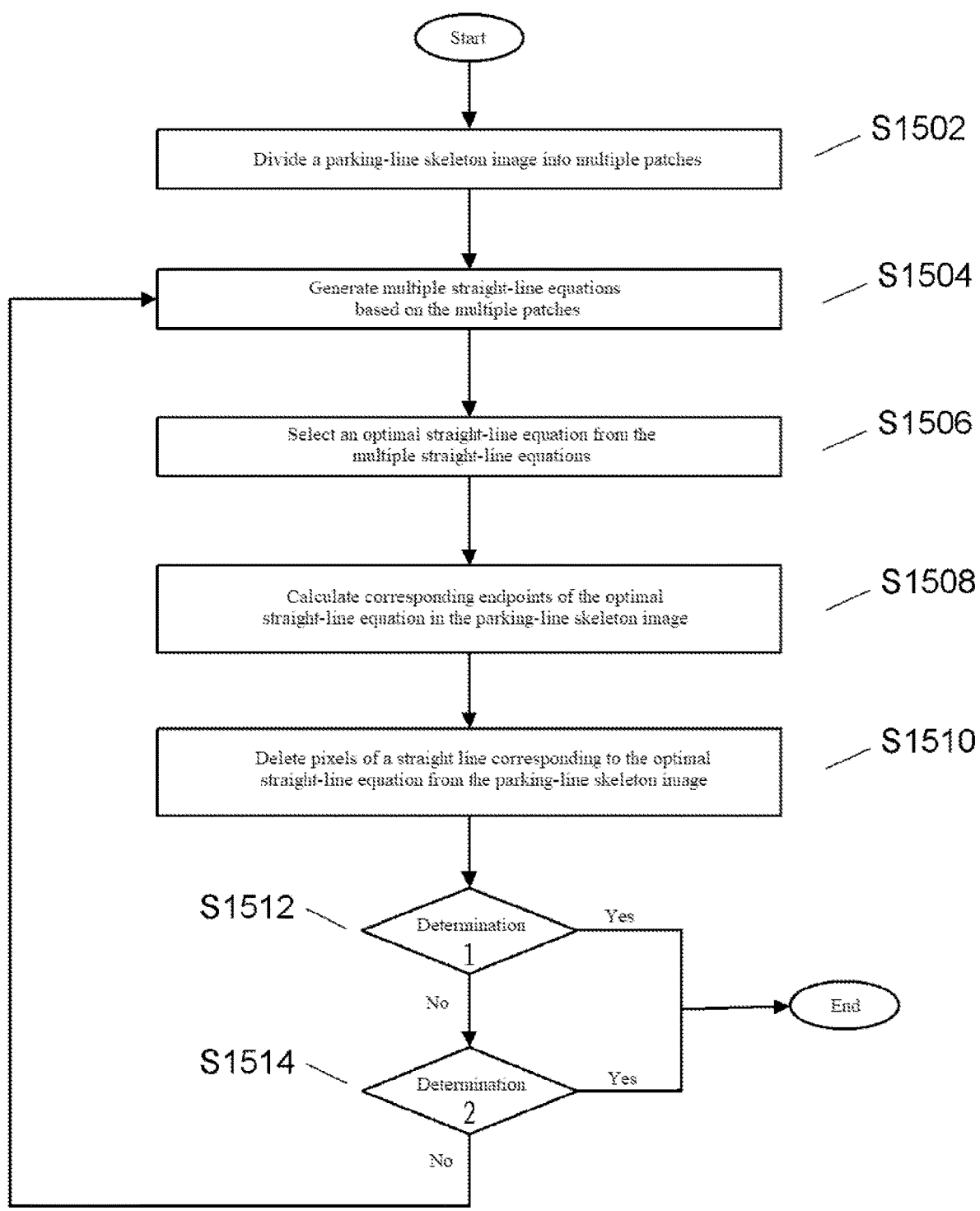
FIG. 15 exemplarily shows a method for calculating straight-line equations and straight-line endpoints for parking lines based on a preprocessed parking-line segmentation image according to one or more embodiments of an implementation of the present disclosure.

FIG. 15 shows a method for calculating straight-line equations and straight-line endpoints for parking lines based on a preprocessed parking-line segmentation image according to one or more embodiments of the present disclosure.

As shown in FIG. 15, at S1502, the parking-line skeleton image is divided into multiple patches. When selecting the size of the patches, the following conditions may be satisfied: the size of the obtained patches through division may advantageously be such that the obtained patches through division can capture a segment on each straight line in the parking-line skeleton image (for example, sub_image_f), and no other straight lines are included in these patches. Since parking lines are arranged generally in order and have a fixed size, the size selection of the patches has a large range to satisfy this condition (the influence of the size selection will be described later in conjunction with FIGS. 17 and 18*a*-18*d*).

At S1504, multiple straight-line equations may be generated based on the multiple patches. Each straight-line equation is formed by fitting the pixels (for example, white pixels) with first color in each patch.

At S1506, an optimal straight-line equation may be selected from the generated multiple straight-line equations in a competitive manner. For example, the straight-line equation matching the largest quantity of white pixels in the parking-line skeleton image is considered to be the optimal straight-line equation among the multiple straight-line equations. In other words, the quantity of white pixels belonging to the straight line represented by the optimal straight-line equation is the largest. At S1508, the corresponding endpoints of the optimal straight-line equation in the parking-line skeleton image may be calculated. Then, at S1510, the white pixels corresponding to the optimal straight-line equation may be deleted from the parking-line skeleton image.

Figure 16:
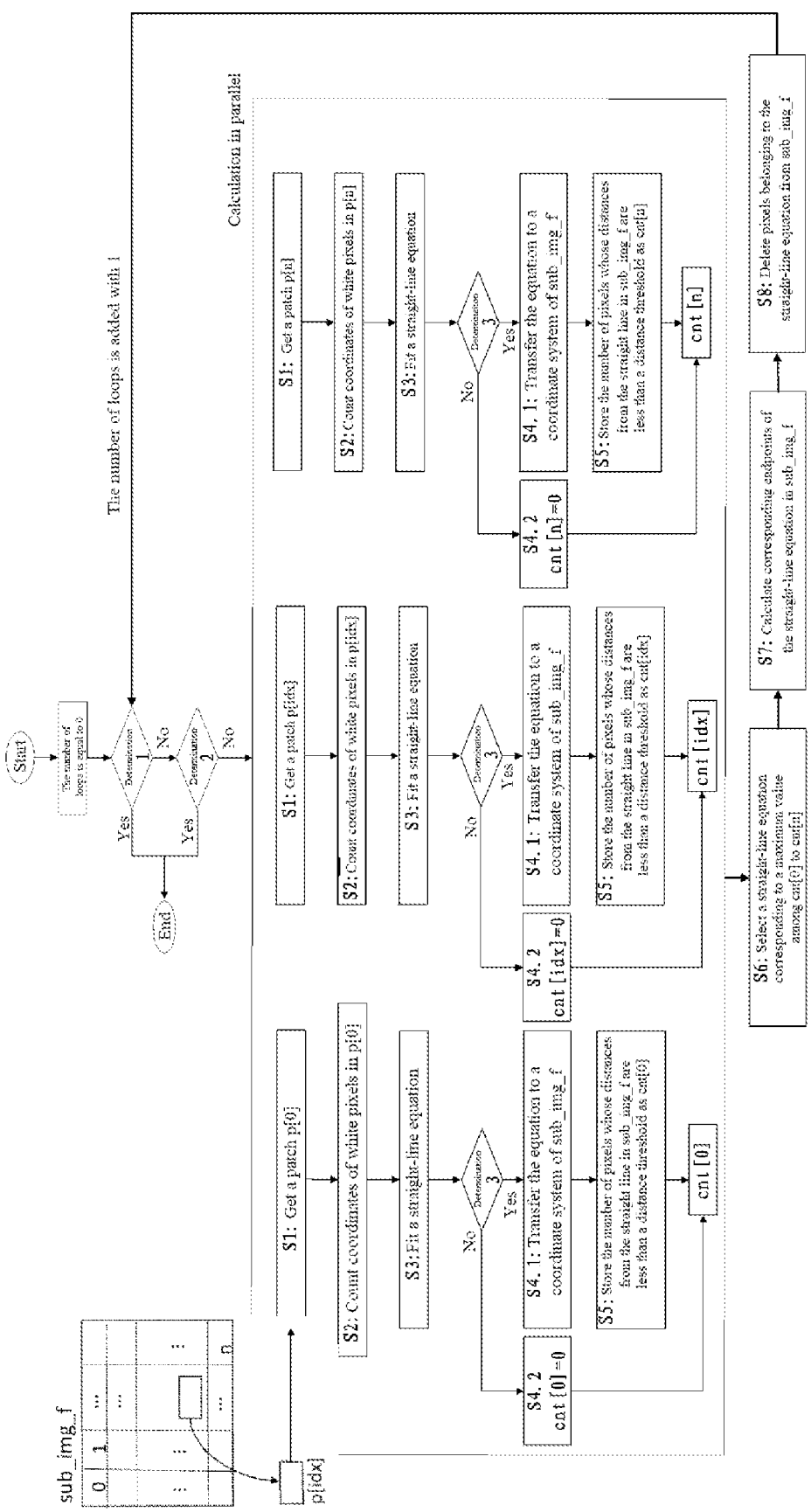
FIG. 16 shows, in more detail, a method for calculating straight-line equations and straight-line endpoints for parking lines based on a preprocessed parking-line segmentation image according to one or more embodiments of the present disclosure.

At S1512, "determination 1" is executed, that is, it is determined whether the number of executions from step S1504 to step S1510 reaches a straight-line quantity threshold. The straight-line quantity threshold represents a maximum quantity of straight lines included in a connection region image (for example, sub-image sub_img). The straight-line quantity threshold may be preset according to system requirements and actual experience. Taking 4 sub-images obtained in FIG. 8 each including a connection region as an example (for example, sub_img1, sub_img2, sub_img3, and sub_img4), it can be seen that sub_img3 includes the most straight lines. If the occluded part is included, sub_img3 includes a total of six straight lines, as shown in FIG. 16. For example, in this example, the straight-line quantity threshold may be determined from multiple pictures in this way to be 6. It will be appreciated that, the selection of the straight-line quantity threshold is only described here by taking each sub-image shown in FIG. 8 as an example, rather than making a specific limit on the size of the threshold value thereof. In fact, when a straight line is found, pixels belonging to the straight line may be deleted in the method of the present disclosure. Therefore, the straight-line quantity threshold may be set arbitrarily, and there is no need to worry that the straight-line quantity threshold will be set too large.

Returning to FIG. 15, if it is determined at S1512 that the number of executions from step S1504 to step S1510 has reached the straight-line quantity threshold, that is, the result of "determination 1" is "Yes", the method ends. If it is determined at S1512 that the number of executions from step S1504 to step S1510 has not reached the straight-line quantity threshold, that is, the result of "determination 1" is "No", the method proceeds to S1514.

At S1514, "determination 2" is executed, that is, it is determined whether the quantity of remaining white pixels in the parking-line skeleton image is less than a pixel quantity threshold after deleting the pixels with first color (for example, white) corresponding to the optimal straight-line equation from the parking-line skeleton image (S1510). In some embodiments, the pixel quantity threshold may be preset according to the calculation accuracy requirement. For example, a preferred range for the pixel quantity threshold may be set to 1-10.

If it is determined at S1514 that the quantity of remaining white pixels in the parking-line skeleton image has been less than the pixel quantity threshold after deleting the pixels corresponding to the optimal straight-line equation from the parking-line skeleton image, that is, the result of "determination 2" is "Yes", the method ends. At this moment, it is considered that all straight lines in the parking-line skeleton image have been found. If it is determined at S1514 that the quantity of remaining white pixels in the parking-line skeleton image is greater than or equal to the pixel quantity threshold, that is, the result of "determination 2" is "No", the method proceeds to S1504, and the steps of S1504-S1510 continue to be performed until the number of loops of steps S1504-S1510 reaches the straight-line quantity threshold or the quantity of remaining white pixels in the parking-line skeleton image is less than the pixel quantity threshold.

In the above method for calculating straight-line equations and straight-line endpoints based on a preprocessed parking-line segmentation image according to one or more embodiments, since a method for further dividing the preprocessed parking-line segmentation image (for example, sub_image_f) into several equal patches to obtain straight-line equations is adopted, the complicated process of adjusting parameters in the existing calculation methods can be avoided. Furthermore, in the method of one or more embodiments of the present disclosure, if white pixels included in one selected patch are not sufficient to reflect the feature of a straight line, the calculated straight-line equation cannot obtain a maximum matching value and will be eliminated. Therefore, selecting a straight-line equation matching the largest quantity of pixels in a competitive manner can ensure that the obtained straight-line equation is the straight-line equation with a high degree of fitting. Furthermore, in the method of one or more embodiments of the present disclosure, by deleting the pixels belonging to the found straight line, the influence of these pixels on subsequent calculation can be avoided, thereby improving the robustness of the calculation results.

FIG. 16 shows, in more detail, a method for calculating straight-line equations and straight-line endpoints for parking lines based on a preprocessed parking-line segmentation image according to one or more embodiments of the present disclosure. FIG. 16 schematically illustrates the overall method in the form of an exemplary algorithmic flow chart.

Figure 17:
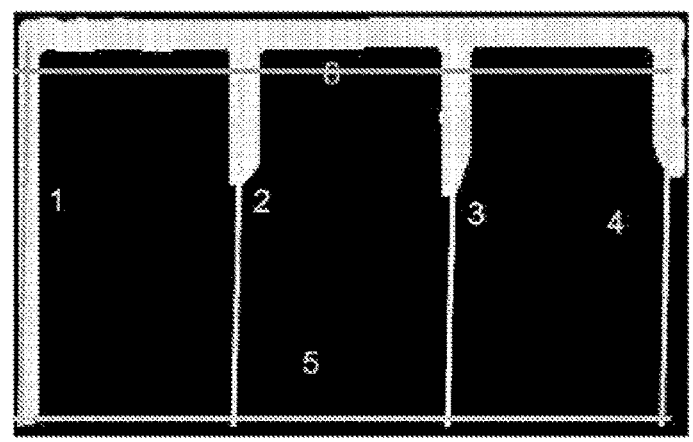
FIG. 17 shows, taking a dilated parking-line segmentation image (sub-image) corresponding to sub_img_3 in FIG. 8 as an example, straight lines included in the sub-image.

The upper left corner of FIG. 16 schematically shows a parking-line skeleton image represented by sub_img_f, where the image sub_img_f is divided into n equal patches. Each patch is referred to, for example, by p[idx], where idx is greater than or equal to 0 and less than or equal to n. The size of the patches depends on the value of n. As mentioned above, when selecting the size of the patches, the following conditions may advantageously be satisfied: the size of the obtained patches through division may advantageously be such that the obtained patches through division can capture a segment on each straight line in the parking-line skeleton image (for example, sub_image_f), and no other straight lines are included in these patches. This point is further explained below with reference to FIGS. 17 and 18a-18d. In order to make the example more clearly displayed, FIG. 17 shows six straight lines included therein, straight lines 1-6, by taking the dilated parking-line segmentation image sub_img3 (see FIG. 8) corresponding to the parking-line skeleton image sub_image_f3 as an example. The straight line numbered 5 may be understood as a hidden straight line caused by occlusion.

Figure 18:
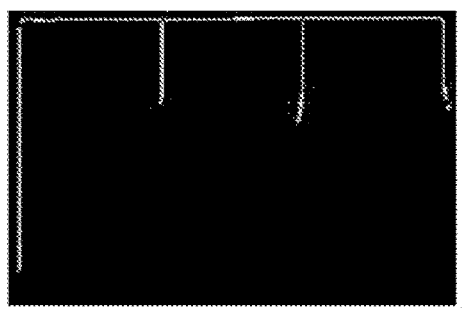
FIGS. 18a-18d respectively show, taking a parking-line skeleton image subjected to skeleton extraction corresponding to sub_img_3 in FIG. 8 as an example, situations where the size of a window used to obtain patches through division patches is appropriate, too large, and too small.
Figure 18:
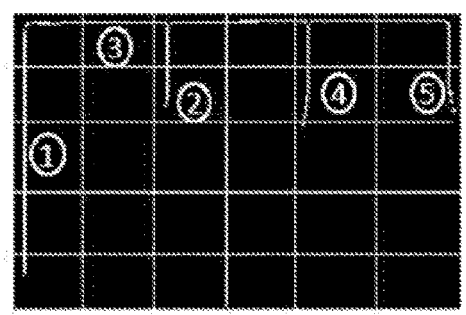
Figure 18:
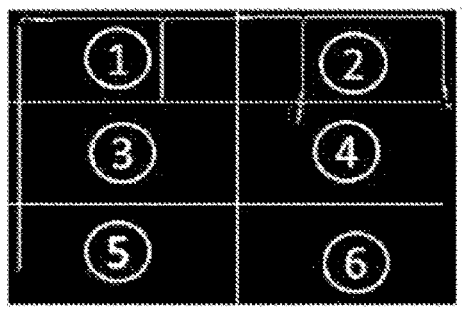
Figure 18:

Taking sub_img_f3 as an example, FIGS. 18d-18d respectively show the problems caused by the situation where the size of a window for patch selection is appropriate, and the extreme situations of being too large and too small. FIG. 18a is the image sub_image_f3. The horizontal and vertical straight lines constituting grids in FIG. 18b are dividing lines used to cut into patches, and each grid represents a patch. It can be seen that equations corresponding to straight lines 1, 2, 6, 3, and 4 in FIG. 17 may be obtained from white pixels included in patches numbered ①, ②, ③, ④, and ⑤, respectively. Since these patches include corresponding straight-line segments and do not include other straight-line segments, the division size of the patches shown in FIG. 18b is appropriate. The division size of the patches in FIG. 18c is too large, and merely the patches numbered ③ and ⑤ meet the requirements and may be used to calculate the equation corresponding to straight line 1 in FIG. 17. The remaining patches either do not include straight lines, or include multiple straight lines, as a result, wrong straight-line equations will be obtained through fitting. FIG. 18d shows a situation where a patch of a small size (for example, 4×3 pixel area) is enlarged. Since the size of the patch is too small, the pixels in the patch include too few white pixels. Too few white pixels cannot represent the features of a straight line, and therefore, a correct straight-line equation cannot be obtained through fitting based on too few white pixels. In an actual environment, since parking lines are arranged generally in order and have a fixed size, the size selection of the patches has a large range to satisfy this condition. The present disclosure does not limit the size of the patches. Those skilled in the art can make debugging selections according to the accuracy of the system and the accuracy requirements for the calculation results.

Returning to FIG. 16, an algorithm flow of the entire method will be described below for the divided multiple patches. After the algorithm starts, an initial value of the number of loops is set to 0, and two determinations: "determination 1" and "determination 2" are then performed sequentially. The determination criteria for these two determination processes are the same as those in the method described above with reference to FIG. 15. That is, the determination process in "determination 1" includes determining whether the number of loops of the entire algorithm reaches a preset straight-line quantity threshold. In one or more embodiments shown in FIG. 16, the number of loops includes, for example, the number of executions from steps S1 to S8. The determination process in "determination 2" includes: determining whether the quantity of remaining white pixels in the parking-line skeleton image (after the execution of step S8) is less than a preset pixel quantity threshold. In other words, there are two conditions for the end of the algorithm flow. One condition is that the number of loops reaches the preset threshold, and the other condition is that the quantity of remaining white pixels in the parking-line skeleton image is less than the threshold. It any one of the two conditions is satisfied, it means that all the straight lines in the parking-line skeleton image have been found, and the algorithm ends.

In the large box in the middle of FIG. 16, a part of parallel calculation for each patch is shown. That is, the calculation for each patch may be independent. For example, parallel calculation methods (such as OpenCL) may be used to accelerate the operation.

The following takes a certain patch as an example to introduce the method for calculating straight-line equations and endpoints for each patch. For example, at S1, a patch p[idx] is obtained. At S2, X and Y coordinates of all pixels with first color (for example, white) in the patch p[idx] are obtained. At S3, based on all the obtained white pixels, a straight-line equation representing a straight line is fitted. For example, methods such as least squares may be used to fit the straight-line equation.

Then, "determination 3" is executed to determine whether the fitted straight-line equation matches at least the white pixels of a certain ratio threshold in the patch p[idx]. In other words, it is determined whether the ratio of the quantity of pixels belonging to the straight-line equation (that is, the quantity of pixels matched by the straight-line equation) to the quantity of all the current white pixels in the entire patch p[idx] is greater than a ratio threshold which may be, for example, a percentage value. Preferably, the ratio threshold may range from 90% to 99%. The white pixel in the patch p[idx] whose distance from the straight line represented by the straight-line equation is less than a distance threshold is considered to be the pixel belonging to the straight line represented by the straight-line equation, that is, the pixel matched by the straight-line equation. In some examples, the distance threshold may be preset to, for example, a few pixel units. The purpose of setting "determination 3" is that it is correct for the straight-line equation to match the vast majority of white pixels in the patch; otherwise, it is considered that the white pixels included in the patch do not have the features of a straight line (multiple straight lines may be included, or an area where a straight line is not appropriate is selected, such as a slightly deformed area). In other words, the calculated straight-line equation has the ability to match a whole straight line in the parking-line skeleton image (sub_image_f) merely if it basically matches all the pixels in the patch.

If the result of determination at "determination 3" is "Yes" (that is, the ratio of the quantity of pixels belonging to the straight line represented by the straight-line equation to the quantity of all the current white pixels in the entire patch p[idx] is greater than the ratio threshold), the algorithm proceeds to S4.1. At S4.1, the straight-line equation is transferred to a coordinate system of the parking-line skeleton image from a coordinate system of patches (that is, transferred from a patch coordinate system to a sub_img_f coordinate system) to represent a straight line in the parking-line skeleton image.

The algorithm then proceeds to S5. At S5, the quantity of the white pixels in the parking-line skeleton image whose distances from the straight line represented by the straight-line equation obtained in step S4 in the parking-line skeleton image are less than a distance threshold is stored as a value of a comparison parameter. That is, in the coordinate system of the parking-line skeleton image, the quantity of current white pixels whose distances from the straight line represented by the straight-line equation are less than the threshold distance is counted, and the quantity is used as a value of a comparison parameter (for example, cnt[idx]).

If the result of determination at "determination 3" is "No" (that is, the ratio of the quantity of pixels belonging to the straight line represented by the straight-line equation to the quantity of all the current white pixels in the entire patch p[idx] is less than or equal to the ratio threshold), the algorithm proceeds to S4.2. At S4.2, the value of the comparison parameter is set to 0.

After the above calculations from S1-S5, the comparison parameter values such as cnt[idx](idx=0, 1, . . . n) may be calculated in parallel for the patches. Then, at S6, the comparison parameter values calculated for the patches are compared, and the straight-line equation corresponding to the largest comparison parameter value among all the comparison parameter values is selected as an optimal straight-line equation. At S7, the corresponding endpoints of the optimal straight-line equation in the parking-line skeleton image (sub_img_f) are calculated. Then, at S8, the pixels corresponding to the optimal straight-line equation are deleted from the parking-line skeleton image. So far, the algorithm is completed for one loop, and determination 1 is executed after adding 1 to the number of loops. The above process is repeated until the end condition is satisfied, and then the algorithm ends.

One or more embodiments of another implementation of the present disclosure may provide an apparatus for an automatic parking system. The apparatus may include a memory and a processor. The memory may be configured to store computer-executable instructions. The processor may be configured to execute the computer-executable instructions to implement the methods described above herein. For example, the processor may be implemented as a microprocessor, a microcontroller, an Application Specific Integrated Circuit (ASIC), a Digital Signal Processor (DSP), discrete logic, or a combination of these and/or other types of circuits or logic. For example, the memory may be a DRAM, a SRAM, a flash memory, or other types of memory. Parameters (for example, conditions and thresholds) and other data structures may be stored and managed separately, may be combined into a single memory or database, or may be logically and physically organized in many different ways. Programs and instruction sets may be parts of a single program, or separate programs, or distributed across a plurality of memories and processors.

Clause 1. A method for an automatic parking system, comprising:
   obtaining a parking-line segmentation image through a segmentation neural network;
   preprocessing the parking-line segmentation image to obtain at least one parking-line skeleton image; and
   calculating straight-line equations and straight-line endpoints for parking lines in the parking-line segmentation image based on the at least one parking-line skeleton image.

Clause 2. The method according to clause 1, wherein the preprocessing the parking-line segmentation image to obtain at least one parking-line skeleton image comprises:
   extracting pixels belonging to parking lines from the parking-line segmentation image and displaying the pixels belonging to parking lines with first color, and displaying the remaining pixels not belonging to parking lines with second color, thereby generating an extracted parking-line segmentation image; and performing skeleton extraction on the extracted parking-line segmentation image to extract skeletons of the parking lines, thereby generating the at least one parking-line skeleton image.

Clause 3. The method according to any of the preceding clauses, wherein the preprocessing the parking-line segmentation image to obtain at least one parking-line skeleton image comprises:

extracting pixels belonging to parking lines from the parking-line segmentation image and displaying the pixels belonging to parking lines with first color, and displaying the remaining pixels not belonging to parking lines with second color, thereby generating an extracted parking-line segmentation image;

dilating the extracted parking-line segmentation image to generate a dilated parking-line segmentation image; and performing skeleton extraction on the dilated parking-line segmentation image to extract skeletons of the parking lines, thereby generating the at least one parking-line skeleton image.

Clause 4. The method according to any of the preceding clauses, wherein the preprocessing the parking-line segmentation image to obtain at least one parking-line skeleton image comprises:

extracting pixels belonging to parking lines from the parking-line segmentation image and displaying the pixels belonging to parking lines with first color, and displaying the remaining pixels not belonging to parking lines with second color, thereby generating an extracted parking-line segmentation image;

dilating the extracted parking-line segmentation image to generate a dilated parking-line segmentation image;

determining at least one connection region based on the dilated parking-line segmentation image, wherein each connection region corresponds to a region in the dilated parking-line segmentation image, each connection region only comprises pixels of parking lines connected to each other, and the pixels of the parking lines belonging to different connection regions are separated from each other;

dividing the dilated parking-line segmentation image according to the connection regions to generate sub-images respectively corresponding to different connection regions; and performing skeleton extraction on each sub-image to generate respective parking-line skeleton images corresponding to the sub-images.

Clause 5. The method according to any of the preceding clauses, wherein the calculating straight-line equations and straight-line endpoints for parking lines in the parking-line segmentation image based on the at least one parking-line skeleton image comprises: performing, for each parking-line skeleton image, the following operations:

A: dividing the parking-line skeleton image into multiple patches;

B: generating multiple straight-line equations based on the multiple patches, wherein each straight-line equation is formed by fitting the pixels with first color in each patch;

C: selecting an optimal straight-line equation from the multiple straight-line equations, wherein the optimal straight-line equation represents the straight line matching the largest quantity of pixels with first color in the parking-line skeleton image;

D: calculating the corresponding endpoints of the optimal straight-line equation in the parking-line skeleton image; and E: deleting the pixels with first color corresponding to the optimal straight-line equation from the parking-line skeleton image;

repeating steps B-E in a loop until the number of loops reaches a straight-line quantity threshold or the quantity of remaining pixels with first color in the parking-line skeleton image is less than a pixel quantity threshold.

Clause 6. The method according to any of the preceding clauses, wherein the generating multiple straight-line equations based on the multiple patches comprises: performing, for each patch, the following operations in parallel:

getting a patch;

obtaining coordinates of the pixels with first color in the patch; and fitting a straight-line equation based on the obtained pixels with first color.

Clause 7. The method according to any of the preceding clauses, further comprising: performing, for each patch, the following operations in parallel:

determining whether the ratio of the quantity of pixels with first color matched by the straight-line equation to the quantity of all pixels with first color in the patch is greater than a ratio threshold, wherein the pixel with first color in the patch whose distance from the straight line represented by the straight-line equation is less than a distance threshold is considered to be the pixel with first color matched by the straight-line equation;

in response to the ratio of the quantity of pixels with first color matched by the straight-line equation to the quantity of all pixels with first color in the patch being greater than the ratio threshold, transferring the straight-line equation to a coordinate system of the parking-line skeleton image to represent a straight line in the parking-line skeleton image, and taking the number of pixels with first color whose distances from the straight line are less than the distance threshold in the parking-line skeleton image as a value of a comparison parameter; and setting the value of the comparison parameter to 0 in response to the ratio of the quantity of pixels with first color matched by the straight-line equation to the quantity of all pixels with first color in the patch being equal to or less than the ratio threshold.

Clause 8. The method according to any of the preceding clauses, further comprising:

comparing multiple comparison parameter values calculated for multiple patches; and selecting the straight-line equation corresponding to the largest comparison parameter value among the multiple comparison parameter values as the optimal straight-line equation.

Clause 9. The method according to any of the preceding clauses, further comprising:

filtering the generated parking-line skeleton image to generate a filtered parking-line skeleton image.

Clause 10. An apparatus for an automatic parking system, comprising:

a memory configured to store computer-executable instructions; and a processor configured to execute the computer-executable instructions to implement the method according to any one of clauses 1-9.

The description of the implementations has been presented for the purposes of illustration and description. The implementations may be appropriately modified and changed according to the above description or these modifications and changes may be obtained by practicing the method. For example, unless otherwise indicated, one or more of the methods described may be performed by a suitable device and/or a combination of devices. The method may be performed by using one or more logic devices (for example, processors) in combination with one or more additional hardware elements (such as storage devices, memories, hardware network interfaces/antennas, switches, actuators, clock circuits, etc.) to execute stored instructions. The method described and associated actions may also be executed in parallel and/or simultaneously in various orders other than the order described in this application. The system described is illustrative in nature, and may include additional elements and/or omit elements. The subject matter of the present disclosure includes all novel and non-obvious combinations of the disclosed various systems and configurations as well as other features, functions, and/or properties.

As used in this application, an element or step listed in the singular form and preceded by the word "a/one" should be understood as not excluding the plurality of elements or steps, unless such exclusion is indicated. Furthermore, references to "one implementation" or "one example" of the present disclosure are not intended to be interpreted as excluding the existence of additional implementations that also incorporate the recited features. The present invention has been described above with reference to specific implementations. However, those of ordinary skill in the art will appreciate that various modifications and changes may be made therein without departing from the broader spirit and scope of the present invention as set forth in the appended claims.

The invention claimed is:

1. A method for an automatic parking system, comprising:
    obtaining a parking-line segmentation image through a segmentation neural network;
    preprocessing the parking-line segmentation image to obtain at least one parking-line skeleton image; and
    calculating straight-line equations and straight-line endpoints for parking lines in the parking-line segmentation image based on the at least one parking-line skeleton image;
    wherein the preprocessing of the parking-line segmentation image to obtain the at least one parking-line skeleton image comprises:
        extracting pixels belonging to the parking lines of the parking-line segmentation image, displaying the extracted pixels with a first color, and displaying remaining pixels of the parking-line segmentation image not belonging to the parking lines with a second color, to generate an extracted parking-line segmentation image;
        dilating the extracted parking-line segmentation image to generate a dilated parking-line segmentation image;
        determining one or more connection regions of the parking-line segmentation image based on the dilated parking-line segmentation image, wherein each connection region of the one or more connection regions corresponds to a region in the dilated parking-line segmentation image, and a connection region of the one or more connection regions comprises a first set of pixels belonging to the parking lines that are connected to each other and separated from a second set of pixels belonging to the parking lines included in different connection regions of the one or more connection regions;
        dividing the dilated parking-line segmentation image according to the one or more connection regions to generate one or more respective sub-images; and
        performing a skeleton extraction on a sub-image of the one or more respective sub-images to generate a respective parking-line skeleton image corresponding to the sub-image.

2. The method according to claim 1, wherein the calculating of straight-line equations and straight-line endpoints for parking lines in the parking-line segmentation image based on the respective parking-line skeleton image comprises:
    performing, for the parking-line skeleton image, the following operations:
        a first operation dividing the parking-line skeleton image into multiple patches;
        a second operation generating multiple straight-line equations based on the multiple patches, wherein each straight-line equation is formed by fitting the extracted pixels with the first color in each patch;
        a third operation selecting an optimal straight-line equation from the multiple straight-line equations, wherein the optimal straight-line equation represents a straight line that matches the largest quantity of the extracted pixels with the first color in the parking-line skeleton image;
        a fourth operation calculating corresponding endpoints of the optimal straight-line equation in the parking-line skeleton image; and
        a fifth operation deleting the extracted pixels with the first color corresponding to the optimal straight-line equation from the parking-line skeleton image, and
    performing the first operation, the second operation, the third operation, the fourth operation, and the fifth operation in a loop until at least one of: a number of repetitions of the first operation, the second operation, the third operation, the fourth operation, and the fifth operation reaches a straight-line quantity threshold; and a quantity of the extracted pixels with the first color remaining in the parking-line skeleton image is less than a pixel quantity threshold.

3. The method according to claim 2, wherein the generating of multiple straight-line equations based on the multiple patches comprises:
    performing, for each patch, the following operations in parallel:
        getting the patch;
        obtaining coordinates of the extracted pixels with the first color in the patch; and
        fitting a straight-line equation based on the obtained coordinates of the extracted pixels with the first color.

4. The method according to claim 3, further comprising:
    performing, for each patch, the following operations in parallel:
        determining whether a ratio of a first quantity of the extracted pixels with the first color matched by the straight-line equation to a second quantity of all the extracted pixels with the first color in the patch is greater than a ratio threshold, wherein a pixel with the first color in the patch whose distance from a first straight line represented by the straight-line equation is less than a distance threshold is considered to be matched by the straight-line equation;

in response to the ratio being greater than the ratio threshold, transferring the straight-line equation to a coordinate system of the parking-line skeleton image to represent a second straight line in the parking-line skeleton image, and taking the first quantity of the extracted pixels with the first color matched by the straight-line equation in the parking-line skeleton image as a value of a comparison parameter; and setting the value of the comparison parameter to 0 in response to the ratio being equal to or less than the ratio threshold.

5. The method according to claim 4, further comprising:
comparing multiple comparison parameter values calculated for the multiple patches; and
selecting the straight-line equation corresponding to a largest comparison parameter value among the multiple comparison parameter values as the optimal straight-line equation.

6. The method according to claim 1, further comprising:
filtering the at least one parking-line skeleton image to generate a filtered parking-line skeleton image.

7. An automatic parking system, comprising:
one or more processors; and
a memory having executable instructions that, when executed, cause the one or more processors to:
obtain a parking-line segmentation image through a segmentation neural network;
extract pixels belonging to parking lines from the parking-line segmentation image, display one or more pixels belonging to the parking lines with a first color, and display one or more remaining pixels not belonging to the parking lines with a second color, to generate an extracted parking-line segmentation image;
dilate the extracted parking-line segmentation image to generate a dilated parking-line segmentation image;
determine one or more connection regions of the parking-line segmentation image based on the dilated parking-line segmentation image, wherein each connection region of the one or more connection regions corresponds to a region in the dilated parking-line segmentation image, and a connection region of the one or more connection regions comprises a first set of pixels of the parking lines that are connected to each other and separated from a second set of pixels of the parking lines included in different connection regions of the one or more connection regions,
divide the dilated parking-line segmentation image according to the one or more connection regions to generate one or more respective sub-images;
perform a skeleton extraction on a sub-image of the one or more respective sub-images to generate a respective parking-line skeleton image corresponding to the sub-image; and
calculate straight-line equations and straight-line endpoints for the parking lines in the parking-line segmentation image based on the respective parking-line skeleton image.

8. The automatic parking system according to claim 7, wherein to calculate straight-line equations and straight-line endpoints for parking lines in the parking-line segmentation image based on the respective parking-line skeleton image comprises:

perform, for the parking-line skeleton image, the following operations:
a first operation to divide the parking-line skeleton image into multiple patches;
a second operation to generate multiple straight-line equations based on the multiple patches, wherein each straight-line equation is formed by fitting the extracted pixels with the first color in each patch;
a third operation to select an optimal straight-line equation from the multiple straight-line equations, wherein the optimal straight-line equation represents a straight line that matches the largest quantity of extracted pixels with the first color in the parking-line skeleton image;
a fourth operation to calculate corresponding endpoints of the optimal straight-line equation in the parking-line skeleton image; and
a fifth operation to delete the extracted pixels with the first color corresponding to the optimal straight-line equation from the parking-line skeleton image, and
perform the first operation, the second operation, the third operation, the fourth operation, and the fifth operation in a loop until at least one of: a number of repetitions of the first operation, the second operation, the third operation, the fourth operation, and the fifth operation reaches a straight-line quantity threshold; and a quantity of the extracted pixels with the first color remaining in the parking-line skeleton image is less than a pixel quantity threshold.

9. The automatic parking system according to claim 8, wherein to generate multiple straight-line equations based on the multiple patches comprises:
perform, for each patch, the following operations in parallel:
get the patch;
obtain coordinates of the extracted pixels with the first color in the patch; and
fit a straight-line equation based on the obtained coordinates of the extracted pixels with the first color.

10. The automatic parking system according to claim 9, wherein the executable instructions further cause the one or more processors to:
perform, for each patch, the following operations in parallel:
determine whether a ratio of a first quantity of the extracted pixels with the first color matched by the straight-line equation to a second quantity of all the extracted pixels with the first color in the patch is greater than a ratio threshold, wherein a pixel with the first color in the patch whose distance from a first straight line represented by the straight-line equation is less than a distance threshold is considered to be matched by the straight-line equation;
in response to the ratio being greater than the ratio threshold, transfer the straight-line equation to a coordinate system of the parking-line skeleton image to represent a second straight line in the parking-line skeleton image, and take the first quantity of the extracted pixels with the first color matched by the straight-line equation in the parking-line skeleton image as a value of a comparison parameter; and
set the value of the comparison parameter to 0 in response to the ratio being equal to or less than the ratio threshold.

11. The automatic parking system according to claim 10, wherein the executable instructions further cause the one or more processors to:

compare multiple comparison parameter values calculated for the multiple patches; and select the straight-line equation corresponding to a largest comparison parameter value among the multiple comparison parameter values as the optimal straight-line equation.

12. The automatic parking system according to claim 7, wherein the executable instructions further cause the one or more processors to:

filter the respective parking-line skeleton image to generate a filtered parking-line skeleton image.

13. A method for an automatic parking system, comprising:

obtaining a parking-line segmentation image through a segmentation neural network;

determining a connection region of the parking-line segmentation image, the connection region comprising a first set of pixels belonging to a first set of parking lines of the parking-line segmentation image that are connected to each other and separated from a second set of pixels belonging to a second set of parking lines included in different connection regions of the parking-line segmentation image;

performing a skeleton extraction on a portion of the parking-line segmentation image corresponding to the connection region, to generate a respective parking-line skeleton image; and calculating straight-line equations and straight-line endpoints for the first set of parking lines based on the parking-line skeleton image;

wherein determining the connection region and performing the skeleton extraction on the portion of the parking-line segmentation image corresponding to the connection region, to generate the respective parking-line skeleton image further comprises:

extracting pixels belonging to the parking lines of the parking-line segmentation image, displaying the extracted pixels with a first color, and displaying remaining pixels of the parking-line segmentation image not belonging to the parking lines with a second color, to generate an extracted parking-line segmentation image;

dilating the extracted parking-line segmentation image to generate a dilated parking-line segmentation image;

determining one or more connection regions of the parking-line segmentation image based on the dilated parking-line segmentation image, wherein each connection region of the one or more connection regions corresponds to a region in the dilated parking-line segmentation image;

dividing the dilated parking-line segmentation image according to the one or more connection regions to generate one or more respective sub-images; and performing the skeleton extraction on a sub-image of the one or more respective sub-images.

* * * * *